US011231636B2

(12) United States Patent
Maker et al.

(10) Patent No.: US 11,231,636 B2
(45) Date of Patent: Jan. 25, 2022

(54) OPTICAL FREQUENCY MIXING MODULE

(71) Applicant: M SQUARED LASERS LIMITED, Glasgow (GB)

(72) Inventors: Gareth Thomas Maker, Glasgow (GB); Graeme Peter Alexander Malcolm, Glasgow (GB); Stephen Webster, Glasgow (GB)

(73) Assignee: M Squared Lasers Limited, Glasgow (GB)

( * ) Notice: Subject to any disclaimer, the term of this patent is extended or adjusted under 35 U.S.C. 154(b) by 257 days.

(21) Appl. No.: 16/077,418

(22) PCT Filed: Feb. 3, 2017

(86) PCT No.: PCT/GB2017/050276
§ 371 (c)(1),
(2) Date: Aug. 10, 2018

(87) PCT Pub. No.: WO2017/137728
PCT Pub. Date: Aug. 17, 2017

(65) Prior Publication Data
US 2020/0301242 A1   Sep. 24, 2020

(30) Foreign Application Priority Data
Feb. 12, 2016 (GB) ..................... 1602591

(51) Int. Cl.
*G02F 1/35* (2006.01)
*G02F 1/355* (2006.01)
(Continued)

(52) U.S. Cl.
CPC .......... *G02F 1/3501* (2013.01); *G02F 1/3534* (2013.01); *G02F 1/3551* (2013.01);
(Continued)

(58) Field of Classification Search
CPC .............................................. G02F 2001/3546
See application file for complete search history.

(56) References Cited

U.S. PATENT DOCUMENTS 3,962,576 A * 6/1976 Kuhl ........................ G02F 1/37
250/201.9
5,260,953 A 11/1993 Rowe
(Continued)

FOREIGN PATENT DOCUMENTS

JP    H0856037 A   2/1996
JP    H10239721 A  9/1998
(Continued)

OTHER PUBLICATIONS

International Search Report and Written Opinion dated May 18, 2017.

*Primary Examiner* — Rhonda S Peace
(74) *Attorney, Agent, or Firm* — FisherBroyles, LLP (57) ABSTRACT

An optical frequency mixing module is described that comprises a nonlinear medium for frequency mixing the photons of one or more input optical fields to generate an output optical field; a nonlinear medium tuner for automatically phase matching the nonlinear medium to the one or more input optical fields to select the wavelength of the output optical field generated by the nonlinear medium; and a first direction correcting optic. The position of the first direction correcting optic relative to the nonlinear medium is dependent upon the selected wavelength of the output optical field and therefore ensures that the position and angle of propagation of this field remains constant and independent of its wavelength of. The optical frequency mixing modules therefore provides a means for automatically selecting the wavelength of the output field with no deviation being imparted onto the position or angle of propagation of the output field.

44 Claims, 6 Drawing Sheets

(51) Int. Cl.
  *G02F 1/37*    (2006.01)
  *H01S 3/00*    (2006.01)
  *H01S 3/16*    (2006.01)

(52) U.S. Cl.
  CPC .............. *G02F 1/37* (2013.01); *H01S 3/0092* (2013.01); *H01S 3/1608* (2013.01); *H01S 3/1616* (2013.01); *H01S 3/1673* (2013.01); *G02F 1/3503* (2021.01)

(56) References Cited

U.S. PATENT DOCUMENTS

| | | | | |
|---|---|---|---|---|
| 5,577,058 A * | 11/1996 | Kafka | ................ | G02F 1/39 |
| | | | | 359/328 |
| 6,614,584 B1 * | 9/2003 | Govorkov | ............ | G02F 1/3544 |
| | | | | 359/328 |
| 7,443,892 B2 * | 10/2008 | Ma | ................ | G02F 1/3544 |
| | | | | 372/21 |
| 7,447,244 B2 * | 11/2008 | Ma | ................ | G02F 1/3501 |
| | | | | 372/108 |
| 8,508,841 B2 * | 8/2013 | Chou | ................ | G02F 1/3501 |
| | | | | 359/328 |
| 8,599,474 B1 | 12/2013 | Kozlov et al. | | |
| 2002/0045104 A1 * | 4/2002 | Efimov | ................ | G03H 1/02 |
| | | | | 430/2 |
| 2007/0025401 A1 * | 2/2007 | Hayashi | ................ | G02F 1/37 |
| | | | | 372/22 |
| 2008/0037600 A1 | 2/2008 | Ma et al. | | |
| 2012/0224252 A1 | 9/2012 | Chou et al. | | |

FOREIGN PATENT DOCUMENTS

| | | |
|---|---|---|
| JP | 2005242257 A | 9/2005 |
| JP | 2008028380 A | 2/2008 |
| JP | 2009540538 A | 11/2009 |
| JP | 2012150186 A | 8/2012 |
| JP | 2012173427 A | 9/2012 |
| JP | 2013222173 A | 10/2013 |
| JP | 2014032309 A | 2/2014 |
| WO | WO 2015/091353 A1 | 6/2015 |

\* cited by examiner

OPTICAL FREQUENCY MIXING MODULE

This application is the U.S. National Stage of International Application No. PCT/GB2017/050276, which was filed on Feb. 3, 2017. This application also claims the benefit of the filing date of GB patent application No. 1602591.8, which was filed on Feb. 12, 2016. The contents of both of those applications are hereby incorporated by reference in its entirety.

The present invention relates to the field of nonlinear optics and in particular to apparatus and methods for frequency mixing one or more optical fields.

BACKGROUND TO THE INVENTION

The nonlinear optical properties of crystals have been exploited for many years in order to mix photons of one or more optical fields so as to generate an output optical field at a desired known frequency or wavelength.

An example of such a process is sum-frequency mixing (SFM). This technique is based on the annihilation of two input photons at angular frequencies $\omega_1$ and $\omega_2$ to generate one photon at frequency $\omega_3$. Sum-frequency generation is a parametric process meaning that the photons satisfy energy conservation, leaving the matter unchanged, as defined by equation (1) below:

$$\hbar\omega_3 \approx \hbar\omega_1 + \hbar\omega_2 \quad (1)$$

wherein $\hbar = h/2\pi$
and h represents Planck's constant

For sum-frequency mixing to occur efficiently, the condition, as defined by equation (2), referred to as phase-matching, must be satisfied:

$$\hbar k_3 \approx \hbar k_1 + \hbar k_2 \quad (2)$$

where $k_1$, $k_2$ and $k_3$ are the angular wavenumbers of the three waves as they travel through the medium. As this condition is satisfied more and more accurately, the sum-frequency generation becomes more and more efficient. Also, as sum-frequency generation occurs over a longer and longer length, the phase-matching must become more and more accurate.

A special case of SFM is second-harmonic mixing (SHM) in which $\omega_1 = \omega_2$. This is possibly the most common type of SFM. This is because in SHG, only one input field is required, as compared with SFM, where if $\omega_1 \neq \omega_2$, and thus two simultaneous input fields are needed which can be more difficult to arrange.

As an alternative process to SFM known in the art is difference frequency mixing (DFM). This is a nonlinear process that involves combining two photons of different energies to produce a third photon whose energy equals the difference between those of the incident photons, as defined by equation (3) below:

$$\hbar\omega_3 \approx \hbar\omega_1 - \hbar\omega_2 \quad (3)$$

wherein $\hbar = h/2\pi$
and h represents Planck's constant

For DFM to occur efficiently the following phase-matching condition as defined by equation (4) must be satisfied:

$$\hbar k_3 \approx \hbar k_1 - \hbar k_2 \quad (4)$$

where $k_1$, $k_2$ and $k_3$ are again the angular wavenumbers of the three waves as they travel through the medium.

Other frequency mixing processes known in the art include third harmonic mixing (THM), high harmonic generation (HHG) and optical parametric amplification (OPA) and down conversion.

As with any second order $\chi^{(2)}$, or higher order, phenomenon in nonlinear optics, the nonlinear processes can only occur under certain predefined conditions e.g. the light is interacting with matter, which is non-centro-symmetric and the input fields have a very high intensity (typically generated by a laser source). The phase matching requirements of equations (2) and (4) means that the frequency, or wavelength, of the generated output fields can be changed by the co-ordinated tuning of both the wavelength of the input field and the position of the nonlinear medium. Changing the position of the nonlinear medium is typically achieved by rotation or translation of the nonlinear crystal within the input fields.

Although such movement provides a means for the frequency, or wavelength, tuning of the generated output fields a corresponding deviation of the propagation direction of the output fields is experienced. This deviation of the output fields is problematic to the development of a commercial optical frequency mixing apparatus since it then requires the operator to realign steering optics for the output field so as to allow it to be employed for its desired purpose. This realignment process is by no means a trivial exercise and requires a high level of skill and effort on the part of the operator. Such realignment is also time-consuming resulting in significant down time for the use of the generated output field.

A second issue with the systems known in the art arises from the fact that nonlinear crystals are not able to convert all of the photons of the one or more of the input fields into photons for the output fields. As a result the output field from such devices often contains unwanted components at the wavelength of the one or more input fields. For certain nonlinear processes the optical fields at these unwanted wavelengths can be of significantly higher powers than that of the desired output wavelength. To address this issue wavelength dependent filters and or carefully designed mirror coatings are required to be employed within the steering optics for the output field. Both of these types of optical components further add to the realignment issues experienced by operators employing those systems known in the art.

It is therefore an object of an aspect of the present invention to provide an optical frequency mixing module that obviates or at least mitigates the foregoing disadvantages of the optical frequency mixing apparatus known in the art.

SUMMARY OF THE INVENTION

According to a first aspect of the present invention there is provided an optical frequency mixing module comprising:
a nonlinear medium for frequency mixing the photons of one or more input optical fields to generate an output optical field;
a nonlinear medium tuner that provides a means for phase matching the nonlinear medium to the one or more input optical fields to select the wavelength of the output optical field generated by the nonlinear medium;
and a first direction correcting optic,
wherein the position of the first direction correcting optic relative to the nonlinear medium is dependent upon the selected wavelength of the output optical field to ensure that the position and angle of propagation of the output optical field remains constant.

The optical frequency mixing module provides a means for selecting the wavelength of the output field with no deviation being imparted onto the position or angle of propagation of the output field.

Most preferably the optical frequency mixing module further comprises an optical field separating device located between the nonlinear medium and the first direction correcting optic that provides a means for spatially separating two or more optical fields dependent on their wavelength. The optical field separating device may comprise a first prism. Alternatively the optical field separating device comprises a grating.

The first direction correcting optic preferably comprises a second prism mounted on a first motion control stage.

The first motion control stage preferably provides a means for linearly translating the position of the second prism. The first motion control stage may provide a means rotating the position of the second prism.

Most preferably the optical frequency mixing module further comprises an optical field dump that provides a means for removing photons from the one or more input optical fields from the output optical field. The optical field dump may comprise one or more beam steering mirrors. The optical field dump may further comprise a light trap arranged to trap light reflected from the one or more beam steering mirrors.

Most preferably the optical frequency mixing module further comprises a first lens located between the nonlinear medium and the optical field separating device and arranged to focus one or more optical fields at the one or more beam steering mirrors.

The incorporation of the optical field separating device and the optical field dump therefore provides a means for the removal of unwanted components at the wavelength of the one or more input fields contained within the output field while allowing the desired wavelength of output optical field to propagate on through the device.

The nonlinear medium may comprise a Barium Borate ($\beta$-BaB$_2$O$_4$) or BBO crystal. In this embodiment the nonlinear medium tuner preferably comprises a second motion control stage that provides a means for rotating the position of the BBO crystal relative to the photons of one or more input optical fields.

The optical frequency mixing module may comprise a second direction correcting optic that provides a means for compensating for deviation of the position and angle of propagation of the output field introduced by rotation of the BBO crystal. Preferably the second direction correcting optic comprises a Brewster plate mounted on a third motion control stage that provides a means for rotating the position of the Brewster plate.

Alternatively, the nonlinear medium comprises a periodically poled crystal e.g. a periodically poled lithium niobate (PPLN) crystal; a periodically poled potassium titanyl phosphate (PPKTP) crystal; or a periodically poled stoichiomatic lithium tantalate (PPSLT) crystal. In this embodiment the nonlinear medium tuner preferably comprises a fourth motion control stage that provides a means for linearly translating the position of the periodically poled crystal relative to the photons of one or more input optical fields. Alternatively the nonlinear medium tuner comprises a heating element arranged to heat the periodically poled crystal.

The optical frequency mixing module may further comprise one or more lenses arranged to collimate or focus the output optical field.

Most preferably the optical frequency mixing module comprises a controller that provides a means for automatically controlling the nonlinear medium tuner and the position of the first direction correcting optic relative to the nonlinear medium. The controller may also provide a means for automatically controlling the position of the second direction correcting optic. The incorporation of the controller therefore allows the optical frequency mixing module to be fully automated making it ideal for use as a commercially available device.

The nonlinear tuner may comprise a crystal registering device that provides a means for the optical frequency mixing module to identify the nonlinear medium. This arrangement allows the optical frequency mixing module to recognise different types of crystals and automatically select the appropriate controls mechanism in order to achieve the desired phase matching for the frequency mixing to take place.

According to a second aspect of the present invention there is provided an optical system the optical system comprises a laser head and an optical frequency mixing module in accordance with the first aspect of the present invention wherein the laser head provides a means for generating one or more input optical fields for the optical frequency mixing module.

The laser head may comprise a first Ti:Sapphire laser optically pumped by a pump laser. The laser head may comprise a frequency doubler that provides a means for frequency doubling the first Ti:Sapphire laser.

The laser head may comprise a second Ti:Sapphire laser optically pumped by the pump laser.

The laser head may comprise a fibre laser. The fibre laser may comprise a thulium-doped silica fibre laser. Alternatively the fibre laser may comprise an erbium-doped silica fibre laser.

The laser head may comprise a frequency-doubled neodymium vanadate laser.

The optical system may comprise a controller wherein the controller provides a means for automatically controlling the components of the laser head. The controller therefore provides a means for automatically controlling the wavelength and or powers of the one or more input optical fields.

The optical system may further comprise a frequency doubling unit arranged to frequency double the output field of the optical frequency mixing module.

Embodiments of the second aspect of the invention may comprise features to implement the preferred or optional features of the first aspect of the invention or vice versa.

According to a third aspect of the present invention there is provided a method of frequency mixing photons of one or more input optical fields the method comprising:
generating an output field by frequency mixing the photons of the one or more input optical fields within a nonlinear medium;
phase matching the nonlinear medium to the one or more input optical fields to select a wavelength of the output optical field generated by the nonlinear medium;
selecting the position of a first direction correcting optic relative to the nonlinear medium dependent upon the selected wavelength of the output optical field to ensure that the position and angle of propagation of the output optical field remains constant.

Most preferably the method of frequency mixing photons of one or more input optical fields further comprises spatially separating the output optical field into wavelength dependent components.

Selecting the position of the first direction correcting optic relative to the nonlinear medium may comprise linearly translating the position of the first direction correcting optic.

Selecting the position of the first direction correcting optic relative to the nonlinear medium may further comprise rotating the position of the first direction correcting optic.

Most preferably spatially separating the output optical field further comprises removing photons from the one or more input optical fields from the output optical field.

Phase matching the nonlinear medium to the one or more input optical fields to select a wavelength of the output optical field generated by the nonlinear medium may comprise varying the rotational position of the nonlinear medium.

The method of frequency mixing photons of one or more input optical fields may further comprises compensating for deviation of the position and angle of propagation of the output field introduced by varying the rotational position of the nonlinear medium.

Phase matching the nonlinear medium to the one or more input optical fields to select a wavelength of the output optical field generated by the nonlinear medium may comprise linearly translating the position of the nonlinear medium relative to the photons of one or more input optical fields.

Phase matching the nonlinear medium to the one or more input optical fields to select a wavelength of the output optical field generated by the nonlinear medium may comprise heating the nonlinear medium.

Most preferably phase matching the nonlinear medium to the one or more input optical fields to select the wavelength of the output optical field generated by the nonlinear medium is automatically selected by a controller.

Most preferably selecting the position of a first direction correcting optic relative to the nonlinear medium is automatically selected by a controller.

Most preferably selecting the position of a second direction correcting optic relative to the nonlinear medium is automatically selected by a controller.

The method of frequency mixing photons of one or more input optical fields may further comprise automatically recognising the nonlinear medium. The method may further comprise selecting a method of phase matching based on the recognition of the nonlinear medium.

Embodiments of the third aspect of the invention may comprise features to implement the preferred or optional features of the first or second aspects of the invention or vice versa.

BRIEF DESCRIPTION OF THE DRAWINGS

There will now be described, by way of example only, various embodiments of the invention with reference to the drawings, of which.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION OF PREFERRED EMBODIMENTS

Figure 1:
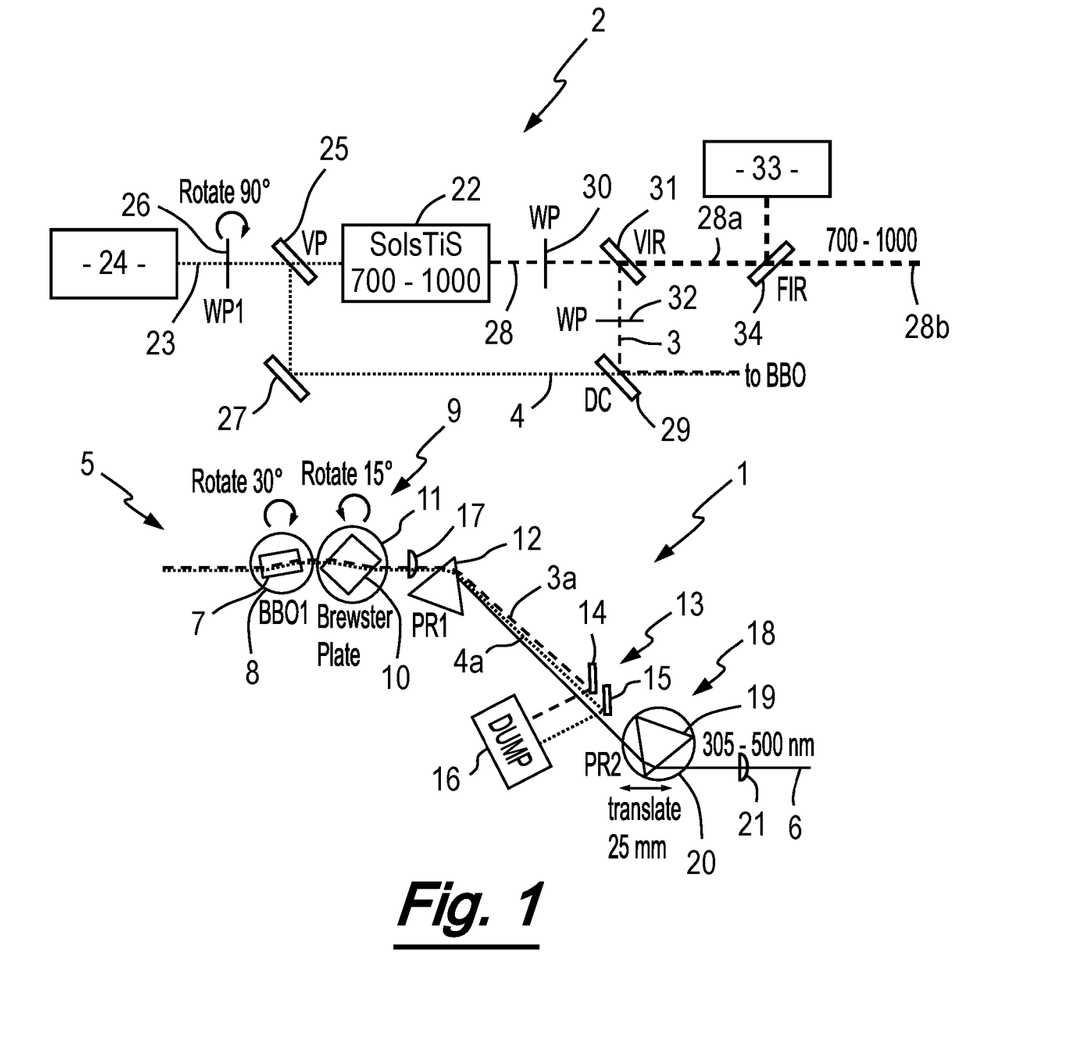
FIG. 1 presents a schematic representation of an optical frequency mixing module in accordance with an embodiment of the present invention employed with a single-head laser source.

An explanation of the present invention will now be described with reference to FIGS. 1 to 6. In particular, FIG. 1 presents a schematic representation of an optical frequency mixing module 1 in accordance with an embodiment of the present invention. In this embodiment a single-head laser source 2 is employed to provide two input optical fields 3 and 4 to the optical frequency mixing module 1.

The optical frequency mixing module 1 can be to comprise a nonlinear medium 5 that provides a means for frequency mixing the photons of the two input optical fields 3 and 4 in order to generate an output optical field 6 at a desired wavelength. In the present embodiment the nonlinear medium 5 comprises a Beta Barium Borate ($\beta$-$BaB_2O_4$), or BBO crystal 7, the nonlinear medium 5 being mounted on a first motion control stage 8. Rotation of the first motion control 8 provides a means for phase matching the nonlinear medium 5 to the input optical fields 3 and 4 to allow for selective tuning the wavelength of the output optical field 6.

Direction correcting optic 9, namely a Brewster plate 10, mounted on a second motion control stage 11 is employed to provide a means for compensating for deviation of the position and angle of propagation of the output field 6 introduced by rotation of the BBO crystal 7 upon the first motion control stage 8.

Located after the nonlinear medium 5 is an optical field separating device 12 that provides a means for spatially separating optical fields dependent on their wavelength. In the presently described embodiment, the optical field separating device 12 comprises a first prism that acts to spatially separate components of the two input optical fields 3a and 4a, not converted by the nonlinear properties of the BBO crystal 7, from the output field 6. In this way the unwanted components of the two input optical fields 3a and 4a can be simply directed to an optical field dump 13 where they are then prevented from exiting the optical frequency mixing module 1. In the presently described embodiment the optical field dump 13 comprises two beam steering mirrors 14 and 15 each positioned to redirect one of the unwanted components of the two input optical fields 3a and 4a into a light trap 16.

It is found beneficial to this process to include a lens 17 located between the nonlinear medium 5 and the optical field separating device 12 and which is arranged to focus the output field 6 and unwanted components onto the two beam steering mirrors 14 and 15. This arrangement provides a means for the removal of unwanted components of the one or more input fields 3a and 4a while allowing the output optical field 6 to propagate on through the device.

In order to compensate for deviation of the position and angle of propagation of the output field 6 produced by wavelength dispersion introduced by the optical field separating device 12 the output field 6 is propagated through direction correcting optic 18. In the presently described embodiment, the direction correcting optic 18 comprises a second prism 19 mounted on a motion control stage 20. This arrangement provides a means for the location of the second prism 19 to be varied as the wavelength of the output field 6 is varied due to rotation of the BBO crystal 7, thus allowing the position and angle of propagation of the output field 6 to remain constant, irrespective of the wavelength of the output field 6.

The optical frequency mixing module 1 may also comprise an output lens 21 that provides a means for focusing or collimating the output field 6 as it exits the apparatus.

The single head laser source 2 of the embodiment of FIG. 1 employed to provide the two input optical fields 3 and 4 can be seen to comprise a Ti:Sapphire laser 22 that is optically pumped with a pump field 23 generated by a pump laser 24. The Ti:Sapphire laser 22 may comprise a SolsTiS® Ti:Sapphire laser, provided by M Squared Lasers Limited, that provides up to 6 W output power at wavelengths in the range of 670 nm to 1050 nm. The pump laser 24 may comprise of a single frequency optically pumped semiconductor laser, that provides up to 18 W output power at a wavelength of 532 nm.

A first polarisation beam splitter 25 and a first waveplate 26 are located in the pump field 23 between the pump laser 24 and the Ti:Sapphire laser 22. These components provide a means for controlling the amount of pump power that is directed into the Ti:Sapphire laser 22 and towards a first pump field beam steering mirror 27.

The pump field 23 reflected from the first pump field beam steering mirror 27 and the output 28 from the Ti:Sapphire laser 22 provide the first 3 and second 4 input optical fields, respectively, for the optical frequency mixing module 1 once they have been combined on dichroic mirror 29. In the presently described embodiment the output 28 of the Ti:Sapphire laser 22 is directed towards the dichroic mirror 29 by the combined effects of a second waveplate 30, a second polarisation beam splitter 31. A third waveplate 32 is employed to ensures that the polarisation of the Ti:Sapphire input field 3 is correct for the nonlinear phase-matching process the optical frequency mixing module 1.

A component of the output 28a of the Ti:Sapphire laser 22 not directed towards the dichroic mirror 29 may be made incident upon a wavemeter 33 so as to provide a means for accurately measuring the wavelength of the output field 28. In the presently described embodiment this is done via a fixed infrared pickoff 34. Employing the fixed IR pickoff 34 also provides the operator with an output 28b from the Ti:Sapphire laser 22 that they can use for an alternative purpose.

Figure 2:
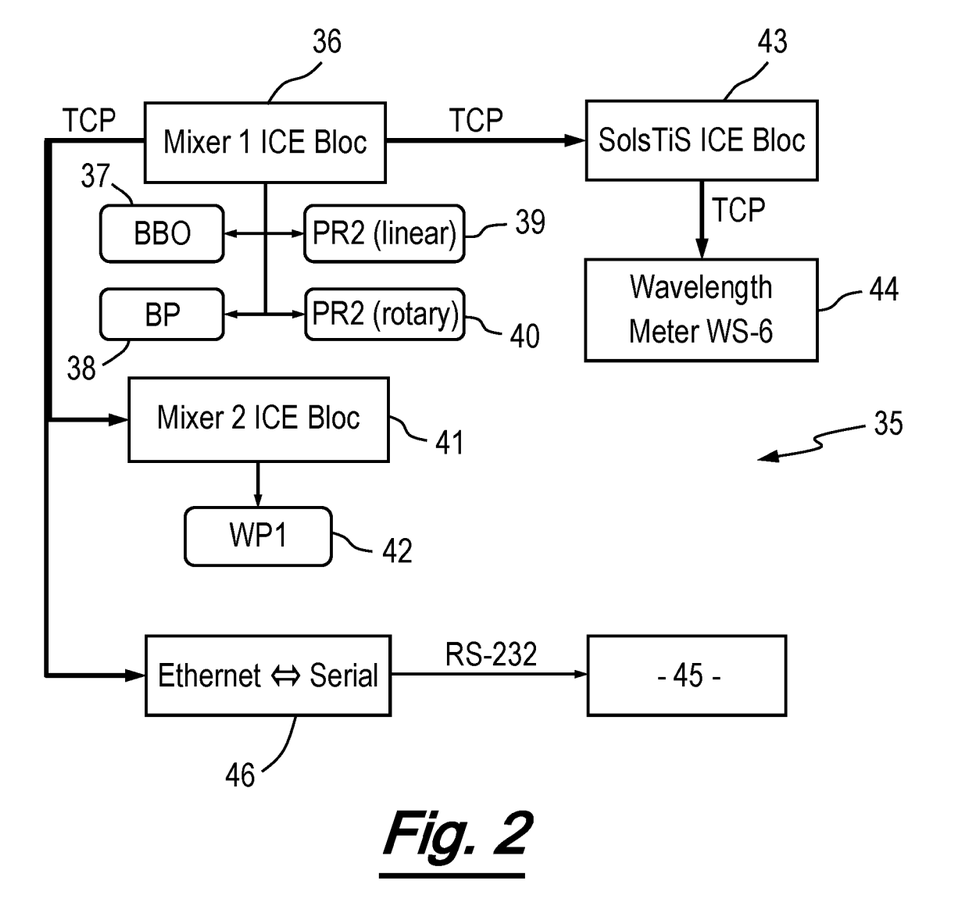
FIG. 2 presents a schematic representation of a controller for the optical frequency mixing module and single head laser source of FIG. 1.

Control of the individual components of the optical frequency mixing module 1 and the single head laser source 2 is automatically provided by a controller 35, a schematic representation of which is provided in FIG. 2. Controller 35 comprises a number of units based on the applicant's proprietary ICE-BLOC® controller technology.

In particular, controller 35 can be seen to comprise a first mixer control unit 36 that controls four sub-units 37, 38, 39 and 40. The sub-units are employed to control: the rotational position of the first motion control stage 8 and hence the rotational position of BBO crystal 7; the rotational position of the second motion control stage 11 and hence the rotational position of the Brewster plate 9, the linear position of the second prism 19; and the rotational position of the second prism 19, respectively.

The controller 35 also comprises a second mixer control unit 41 that controls sub-unit 42. This sub-unit is employed to control the rotational position of the first waveplate 26.

The controller 35 further comprises three further control units 43, 44 and 45. These control units are employed to control the Ti:Sapphire laser 22, the wavemeter 33 and the pump laser 24.

Communication between the various units is generally achieved by employing Transmission Control Protocol (TCP). However, since the pump laser employed comprised a proprietary device that employs RS-232 serial technology the controller further comprises a convertor 46 that provides a means for converting TCP to RS-232. Employing the BBO crystal 7 allows the optical frequency mixing module 1 to be employed in three different configurations i.e. SHG, SFM and DFM all of which are controlled automatically by the controller 35. When employed in conjunction with the single-head laser source a large wavelength range for the output field 6 can be achieved as summarised in Table 1 below:

TABLE 1

| Ti:Sapphire laser and pump laser (532 nm) | |
|---|---|
| Configuration | Output Wavelength (nm) |
| SHG from Ti:Sapphire | 335 to 525 |
| SFM of Ti:Sapphire and Pump Laser | 297 to 353 |
| DFM of Ti:Sapphire and Pump Laser | 1078 to 2583 |

These wavelengths are all obtained automatically following selection of a desired wavelength by an operator. Once selected the controller 35 automatically controls the output wavelength of the Ti:Sapphire laser 22 and the position of the optical components of the optical frequency mixing module 1 required to provide the output optical field 6 at the desired wavelength i.e. the required the wavelength for the input field 3 generated by the Ti:Sapphire laser 22 and the phase matching requirements for the nonlinear medium 5 are automatically set.

Figure 3:
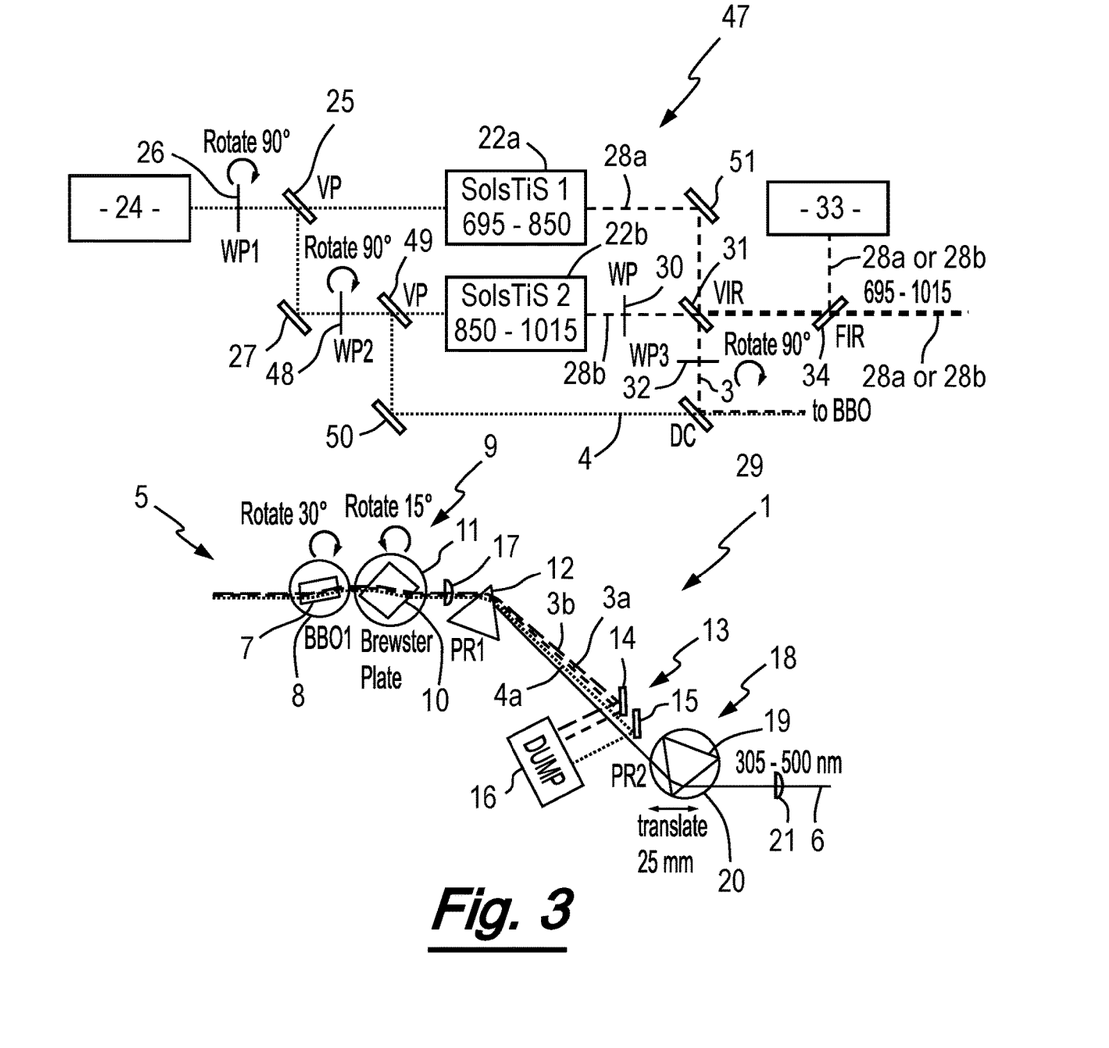
FIG. 3 presents a schematic representation of the optical frequency mixing module of FIG. 1 with a double-head laser source.

In order to provide greater flexibility in generation of the output field 6 and to increase the associated power outputs of the output field 6 an alternative laser source 47, as presented in FIG. 3 may be employed. This is a double-head laser source comprising two Ti:Sapphire laser 22a and 22b both of which are optically pumped by the pump laser 24. In practice only one of the Ti:Sapphire lasers 22a and 22b are employed at any particular time to generate input field 3.

Double-head laser source 47 shares many components in common with the above described single-head laser source 2 and so like parts are marked within FIG. 3 with the same reference numerals. The double-head laser source 47 can however be seen to comprise a fourth waveplate 48 and a third polarisation beam splitter 49 located in the pump field 23 between the first pump field beam steering mirror 27 and Ti:Sapphire laser 22b. A second pump field beam steering mirror 50 is also now located between the third polarisation beam splitter 49 and dichroic mirror 29. An IR beam steering mirror 51 is located to direct the output field 28a from Ti:Sapphire laser 22a towards the second variable polarisation beam splitter 31 where it is combined with the output field 28b from Ti:Sapphire laser 22b to produce the first input field 3 for the optical frequency mixing module 1. The third waveplate 32 is again employed to maintain the correct polarisation for the input field 3 for the optical frequency mixing module 1 irrespective of which Ti:Sapphire laser 22a and 22b it originates from.

Figure 4:
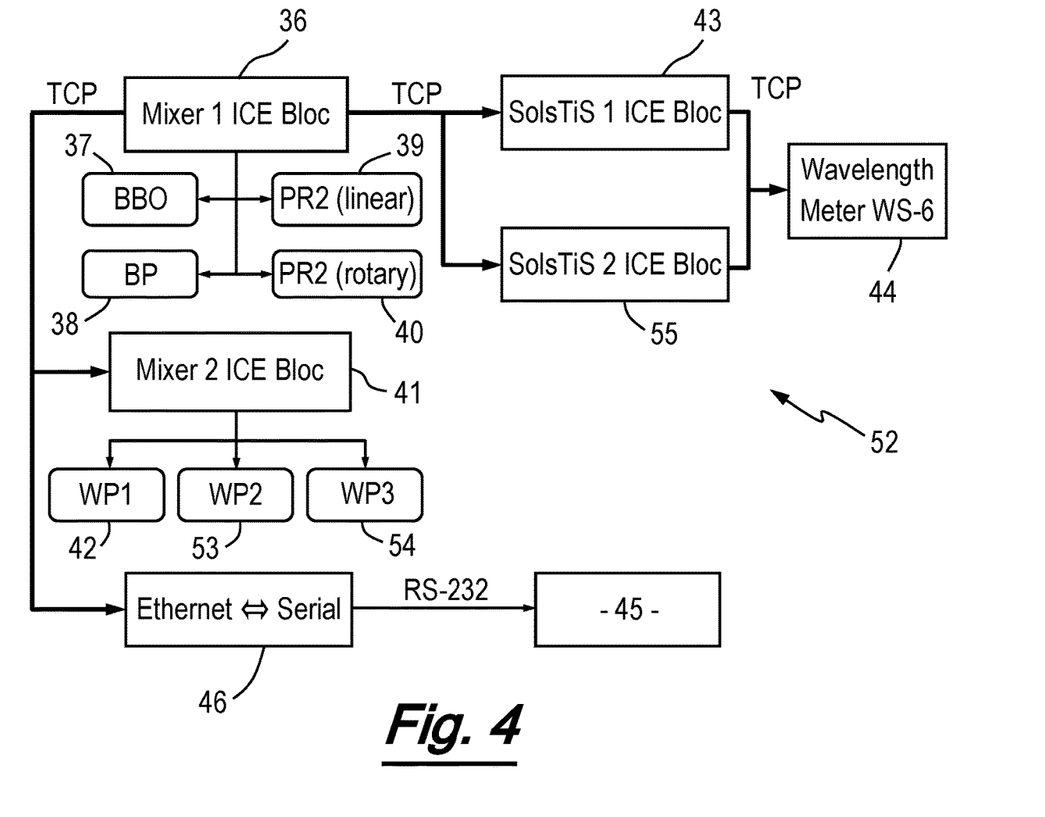
FIG. 4 presents a schematic representation of a controller for the optical frequency mixing module and the double-head laser source of FIG. 2.

Control of the individual components of the optical frequency mixing module 1 and the double head laser source 47 are automatically provided by a controller 52, a schematic representation of which is provided in FIG. 4. Controller 52 is similar to the above described controller 35 with the addition of a second 53 and third sub-unit 54 within the second mixer control unit 41 that are employed to control the rotational position of the third 32 and fourth waveplates 48 and a control unit 55 to control the operation of Ti:Sapphire laser 22b and in particular to provide a means for automatically selecting the required the wavelength for the input field 3 required to generate the wavelength of the output field 6 selected by an operator.

Figure 5:
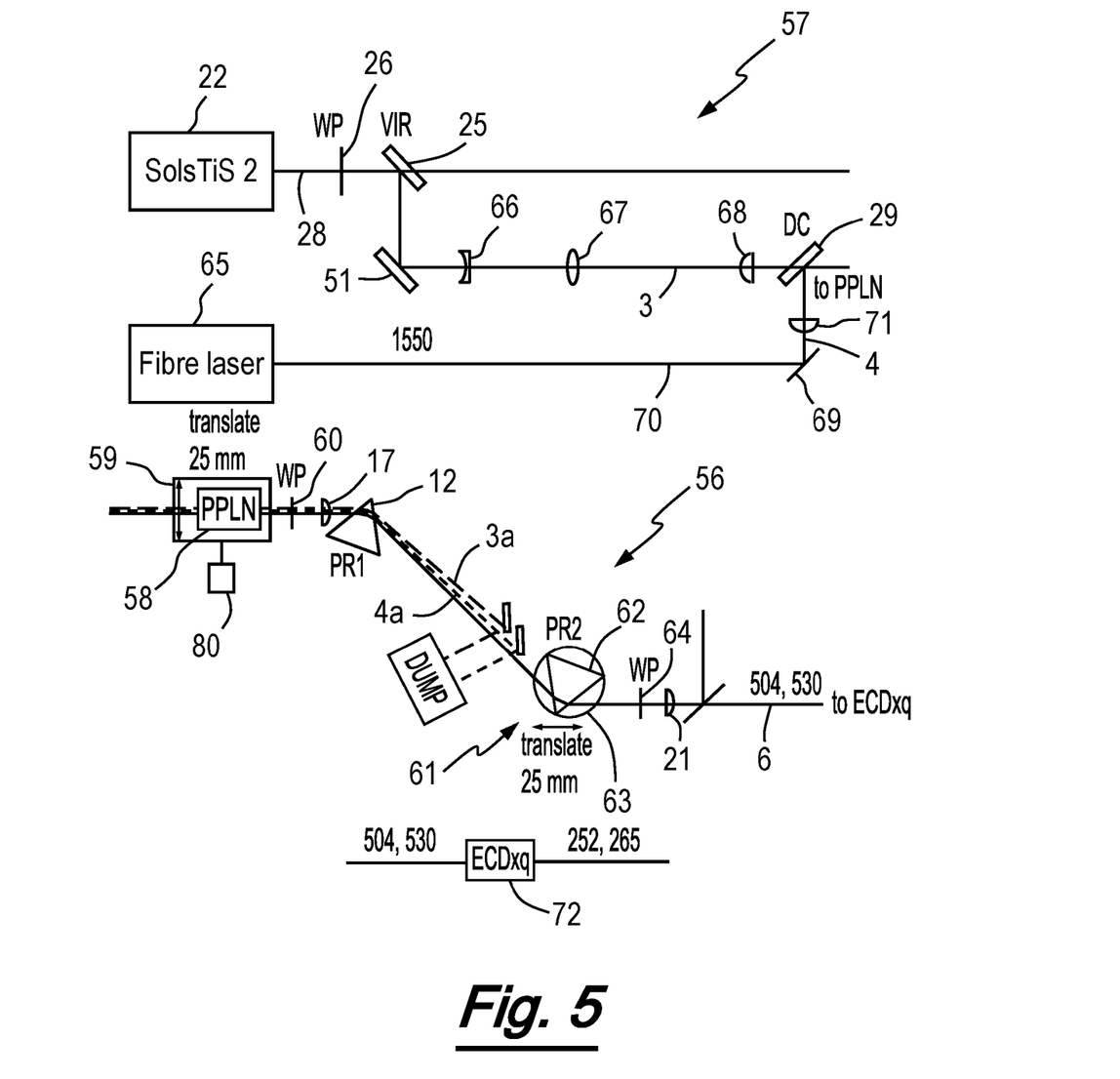
FIG. 5 presents a schematic representation of an optical frequency mixing module in accordance with an alternative embodiment of the present invention employed with a double-head laser source.

FIG. 5 presents a schematic representation of an optical frequency mixing module 56 in accordance with an alternative embodiment of the present invention. In this embodiment a double-head laser source 57 is employed to provide the two input optical fields 3 and 4 to the optical frequency mixing module 56.

In this embodiment the nonlinear medium 5 of the optical frequency mixing module 56 comprises a periodically poled lithium niobate (PPLN) crystal 58 mounted on a first motion control stage 59. The PPLN crystal 58 may comprise a poling period defined by a fan grating or a combination of single gratings so as to provide continuous or discrete tuning of the output optical field 6 when the first motion control stage 59 is employed to move the PPLN crystal 58 in a direction perpendicular to the propagation direction of the two input optical fields 3 and 4.

In an alternative embodiment the nonlinear medium 5 of the optical frequency mixing module 56 may comprises a PPLN crystal 58 having a poling period defined by a single grating. In this embodiment the PPLN crystal 58 is mounted on a temperature controlled pedestal that provides a means for temperature tuning the wavelength the output optical field 6. It will be appreciated that by providing the first motion control stage 59 with a heating element allows the same component to be employed with both of the above describe types of PPLN crystal 58.

The optical frequency mixing module 56 may also comprise a first waveplate 60 that provides a means for defining the polarisation of the output field 6 and lens 17 for focusing the output field 6 as it exits the first waveplate 60.

Located after the nonlinear medium 5 is the optical field separating device 12 that is again employed to provide a means for spatially separating optical fields dependent on their wavelength. In the presently described embodiment, the optical field separating device 12 comprises a first prism that acts to spatially separate components of the two input optical fields 3a and 4a, not converted by the nonlinear properties of the PPLN crystal 58, from the output field 6. In this way the unwanted components of the two input optical fields 3a and 4a can be simply directed to the optical field dump 13, in a similar manner to that described above.

In order to compensate for deviation of the position and angle of propagation of the output field 6 introduced by tuning of output wavelength of the PPLN crystal 58 and or by dispersion induced by the optical field separating device 12 the output field 6 is propagated through a direction correcting optic 61. In the presently described embodiment, the direction correcting optic 61 comprises a second prism 62 mounted on a second motion control stage 63. This arrangement provides a means for the location of the second prism 62 to be varied as the wavelength of the output field 6 is varied due to translation of the PPLN crystal 58, thus allowing the position and angle of propagation of the output field 6 to remain constant irrespective of the wavelength of the output field 6.

The optical frequency mixing module 56 may also comprise a second waveplate 64 to again provide a means for defining the polarisation of the output field 6 and an output lens 21 that provides a means for focusing or collimating the output field 6 as it exits the apparatus.

The double-head laser source 57 of the embodiment of FIG. 5 employed to provide the two input optical fields 3 and 4 can be seen to comprise a Ti:Sapphire laser 22 and a fibre laser 65. The fibre laser 65 may comprise an erbium-doped silica fibre laser that provides up to 10 W output power at a wavelength of 1550 nm. Alternatively, the fibre laser 65 may comprise a thulium-doped silica fibre laser that provides up to 5 W output power at a wavelength of 1950 nm.

A first polarisation beam splitter 25 and a first waveplate 26 are located in the Ti:Sapphire output field 28. These components provide a means for controlling the amount of the Ti:Sapphire output field 28 that is directed towards an IR beam steering mirror 51 located to direct the output field 28 from Ti:Sapphire laser 22 towards the dichroic mirror 29. This component of the Ti:Sapphire output field 28 is employed as the first input optical field 3 for the optical frequency mixing module 56.

One or more lenses 66, 67 and 68 may be located between the IR beam steering mirror 51 and the dichroic mirror 29.

In a similar manner, beam steering mirror 69 is located to direct the output field 70 from the fibre laser 65 towards the dichroic mirror 29. A further lens 71 may be located between beam steering mirror 69 and the dichroic mirror 29. This component of the fibre laser output field 70 is employed as the second input optical field 4 for the optical frequency mixing module 56.

A component of the output field 28a of the Ti:Sapphire laser 22 not directed towards the dichroic mirror 29 may be made incident upon a wavemeter 33 so as to provide a means for accurately measuring the wavelength of the output field 28a. Alternatively this component of the output field 28a may be employed by an operator for an alternative purpose.

The optical frequency mixing module 56 may further comprise a frequency doubling unit 72 arrange to frequency double the output field 6. A suitable frequency doubling unit 72 is one based on the angular tuning of a BBO crystal within a resonant enhancement cavity, as is known in the art.

Figure 6:
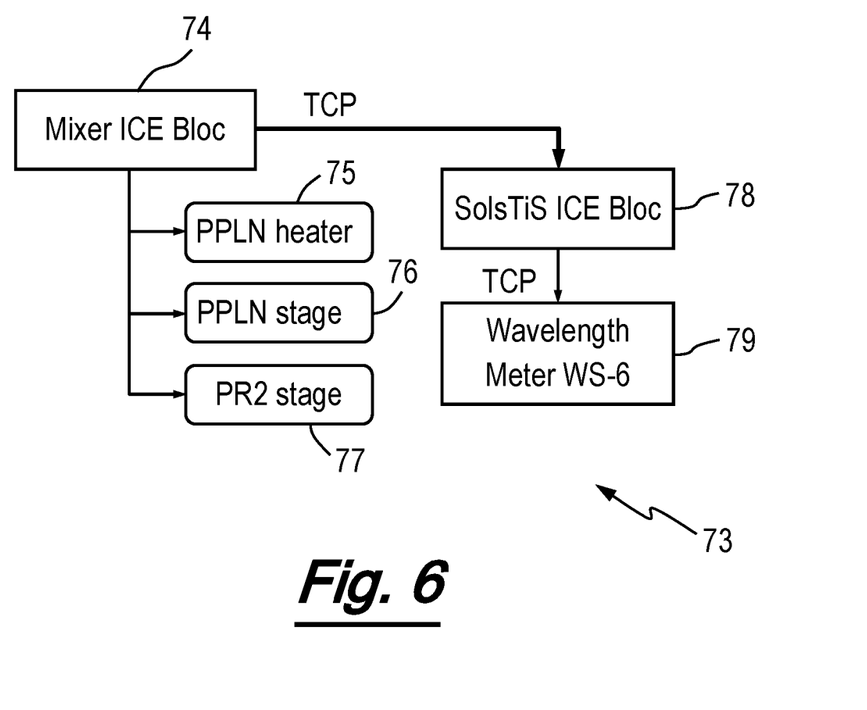
FIG. 6 presents a schematic representation of a controller for the optical frequency mixing module and the double-head laser source of FIG. 5.

Control of the individual components of the optical frequency mixing module 56 and the double head laser source 47 is automatically provided by a controller 73, a schematic representation of which is provided in FIG. 6. Controller 73 again comprises a number of units based on the applicant's proprietary ICE-BLOC® controller technology.

In particular, controller 73 can be seen to comprise a first mixer control unit 74 that controls three sub-units 75, 76 and 77. The sub-units are employed to control: the heating of the first motion control stage 59 upon which the PPLN crystal 58 is mounted; the linear position of the first motion control stage 59 and hence the position of the PPLN crystal 58; and the linear position of the second translation stage 63 and hence second prism 19, respectively.

The controller 73 further comprises two further control units 78 and 79. These control units are employed to control the Ti:Sapphire laser 22 and the wavemeter 33 and in particular the wavelength of the Ti:Sapphire laser 22 by employing feedback from the wavemeter 33.

The first motion control stage 59 may further comprise a crystal registering device 80 that provides a means for the optical frequency mixing module 56 to identify the type of periodic poled crystal mounted thereon. This may take the form of a Reed switch one part of which is attached to the first motion control stage 59 and the second part attached to PPLN crystal 58 having a poling period defined by a single grating.

When the PPLN crystal 58 having a poling period defined by a single grating is mounted on the first motion control stage 59 the Reed switch is activated and the controller 73 knows that it has to activate sub-unit 75 in order to heat the first motion control stage 59. Alternatively, if the Reed switch is not activated i.e. a PPLN crystal 58 comprises a poling period defined by a fan grating or a combination of single gratings is mounted on the first motion control stage 59 then the controller 73 knows that it has to activate sub-unit 76 in order to linearly translate the first motion control stage 59.

This arrangement allows the optical frequency mixing module 56 to be used with different types of periodically poled nonlinear crystals that require different controls in order to achieve the desired phase matching for the frequency mixing to take place.

Employing the PPLN crystal 58 allows the optical frequency mixing module 56 to be employed in three different configurations i.e. SFM, DFM and SHG all of which are controlled automatically by the controller 73. When employed in conjunction with the double-head laser source a large wavelength range for the output field 6 can be achieved as summarised in Tables 2 and 3 below:

TABLE 2

| Ti:Sapphire laser and erbium-doped silica fibre laser (1550 nm) | |
|---|---|
| Configuration | Output Wavelength (nm) |
| SFM of Ti:Sapphire and erbium-doped silica fibre laser | 468 to 626 |
| SHG of output field genetared by SFM of Ti:Sapphire and erbium-doped silica fibre laser | 234 to 313 |
| DFM of Ti:Sapphire and erbium-doped silica fibre laser | 1180 to 3255 |

TABLE 3

| Ti:Sapphire laser and thulium-doped silica fibre laser (1950 nm) | |
|---|---|
| Configuration | Output Wavelength (nm) |
| SFM of Ti:Sapphire and thulium-doped silica fibre laser | 499 to 683 |
| SHG of output field genetared by SFM of Ti:Sapphire and thulium-doped silica fibre laser | 249 to 341 |
| DFM of Ti:Sapphire and thulium-doped silica fibre laser | 1021 to 2275 |

It will be appreciated by the skilled reader that alternate laser sources may be employed with the above described optical frequency mixing modules so as to provide access to optical output fields of different wavelengths e.g. a frequency-doubled neodymium vanadate laser.

In a similar manner, alternative nonlinear mediums those based on BBO crystals and PPLN crystals, as described in detail above, may also be employed in order to gain access to optical output fields of different wavelengths, for example a periodically poled potassium titanyl phosphate (PPKTP) crystals or a periodically poled stoichiomatric lithium tantalate (PPSLT) crystal.

The above described optical frequency mixing modules provide a means for automatically selecting the wavelength of the output field as a result of the automated tuning of one or more of its internal components and tuning of the wavelengths of one or both of the input optical fields. Significantly this is achieved with no deviation being imparted onto the position or angle of propagation of the output field.

The incorporation of the optical field dump also provides a simpler solution for the removal of unwanted components at the wavelength of the one or more input fields contained within the output field as compared to those presently employed in the art.

As a result, an operator is not required to realign any steering optics for the output field thus making the optical frequency mixing module simpler to use while reducing down time associated with those systems known in the art. This makes the presently described optical frequency mixing modules highly suited for use as a commercial, "turnkey" optical frequency mixing module.

An optical frequency mixing module is described that comprises a nonlinear medium for frequency mixing the photons of one or more input optical fields to generate an output optical field; a nonlinear medium tuner for automatically phase matching the nonlinear medium to the one or more input optical fields to select the wavelength of the output optical field generated by the nonlinear medium; and a first direction correcting optic. The position of the first direction correcting optic relative to the nonlinear medium is dependent upon the selected wavelength of the output optical field and therefore ensures that the position and angle of propagation of this field remains constant and independent of its wavelength of. The optical frequency mixing modules therefore provides a means for automatically selecting the wavelength of the output field with no deviation being imparted onto the position or angle of propagation of the output field.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An optical frequency mixing module comprising:
 a nonlinear medium for frequency mixing the photons of one or more input optical fields to generate an output optical field;
 a nonlinear medium tuner that provides a means for phase matching the nonlinear medium to the one or more input optical fields to select a wavelength of the output optical field generated by the nonlinear medium;
 a first direction correcting optic; and
 an optical field separating device located between the nonlinear medium and the first direction correcting optic that provides a means for spatially separating the one or more input optical fields not converted by the nonlinear properties of the nonlinear medium from the output optical field and that prevents the one or more input optical fields from propagating through the first direction correcting optic, wherein the position of the first direction correcting optic relative to the nonlinear medium is dependent upon the selected wavelength of the output optical field to ensure that the position and angle of propagation of the output optical field remains constant.

2. An optical frequency mixing module as claimed in claim 1 wherein the optical field separating device comprises a first prism.

3. An optical frequency mixing module as claimed in claim 1 wherein the optical field separating device comprises a grating.

4. An optical frequency mixing module as claimed in claim 1 wherein the first direction correcting optic comprises a second prism mounted on a first motion control stage.

5. An optical frequency mixing module as claimed in claim 4 wherein the first motion control stage provides a means for linearly translating the position of the second prism.

6. An optical frequency mixing module as claimed in claim 4 wherein the first motion control stage provides a means rotating the position of the second prism.

7. An optical frequency mixing module as claimed in claim 1 wherein the optical frequency mixing module further comprises an optical field dump that provides a means for removing photons from the one or more input optical fields spatially separated front the output optical field.

8. An optical frequency mixing module as claimed in claim 7 wherein the optical field dump comprises one or more beam steering mirrors.

9. An optical frequency mixing module as claimed in claim 8 wherein the optical field dump further comprise a light trap arranged to trap light reflected from the one or more beam steering mirrors.

10. An optical frequency mixing module as claimed in claim 8 wherein the optical frequency mixing module further comprises a first lens located between the nonlinear medium and the optical field separating device and arranged to focus one or more optical fields at the one or more beam steering mirrors.

11. An optical frequency mixing module as claimed in claim 1 wherein the nonlinear medium comprises a Barium Borate (β-BaB2O4) or BBO crystal.

12. An optical frequency mixing module as claimed in claim 11 wherein the nonlinear medium tuner comprises a second motion control stage that provides a means for rotating the position of the BBO crystal relative to the photons of one or more input optical fields.

13. An optical frequency mixing module as claimed in claim 12 wherein the optical frequency mixing module further comprise a second direction correcting optic that provides a means for compensating for deviation of the position and angle of propagation of the output field introduced by rotation of the BBO crystal.

14. An optical frequency mixing module as claimed in claim 13 wherein the second direction correcting optic comprises a Brewster plate mounted on a third motion control stage that provides a means for rotating the position of the Brewster plate.

15. An optical frequency mixing module as claimed in claim 1 wherein the nonlinear medium comprises a periodically poled crystal.

16. An optical frequency mixing module as claimed in claim 15 wherein the periodically poled crystal comprises a crystal selected from the group comprising a periodically poled lithium niobate (PPLN) crystal; a periodically poled potassium titanyl phosphate (PPKTP) crystal; and a periodically poled stoichiomatric lithium tantalate (PPSLT) crystal.

17. An optical frequency mixing module as claimed in claim 15 wherein the nonlinear medium tuner comprises a fourth motion control stage that provides a means for linearly translating the position of the PPLN crystal relative to the photons of one or more input optical fields.

18. An optical frequency mixing module as claimed in claim 15 wherein the nonlinear medium tuner comprises a heating element arranged to heat the PPLN crystal.

19. An optical frequency mixing module as claimed in claim 1 wherein the optical frequency mixing module further comprises one or more lenses arranged to collimate or focus the output optical field.

20. An optical frequency mixing module as claimed in claim 1 wherein the optical frequency mixing module further comprises a controller that provides a means for automatically controlling the nonlinear medium tuner and the position of the first direction correcting optic relative to the nonlinear medium.

21. An optical frequency mixing module as claimed in claim 20 wherein the controller also provides a means for automatically controlling the position of a second direction correcting optic.

22. An optical frequency mixing module as claimed in claim 1 wherein the nonlinear tuner comprises a crystal registering device that provides a means for the optical frequency mixing module to identify the nonlinear medium.

23. An optical system comprising a laser head and an optical frequency mixing module as claimed in claim 1 wherein the laser head provides a means for generating one or more input optical fields for the optical frequency mixing module.

24. An optical system as claimed in claim 23 wherein the laser head comprises a first Ti:Sapphire laser optically pumped by a pump laser.

25. An optical system as claimed in claim 24 wherein the laser head further comprises a frequency doubler that provides a means for frequency doubling the first Ti:Sapphire laser.

26. An optical system as claimed in claim 24 wherein the further laser head comprises a second Ti:Sapphire laser optically pumped by the pump laser.

27. An optical system as claimed in claim 23 wherein the laser head comprises a fibre laser.

28. An optical system as claimed in claim 27 wherein the fibre laser comprises a thulium-doped silica fibre laser or an erbium-doped silica fibre laser.

29. An optical system as claimed in claim 23 wherein the laser head comprises a frequency-doubled neodymium vanadate laser.

30. An optical system as claimed in claim 23 wherein the optical system further comprises a controller wherein the controller provides a means for automatically controlling the components of the laser head.

31. An optical system as claimed in claim 23 wherein the optical system further comprises a frequency doubling unit arranged to frequency double the output field of the optical frequency mixing module.

32. A method of frequency mixing photons of one or more input optical fields the method comprising:
   generating an output field by frequency mixing the photons of the one or more input optical fields within a nonlinear medium;
   phase matching the nonlinear medium to the one or more input optical fields to select a wavelength of the output optical field generated by the nonlinear medium;
   selecting the position of a first direction correcting optic relative to the nonlinear medium dependent upon the selected wavelength of the output optical field to ensure that the position and angle of propagation of the output optical field remains constant;
   employing an optical field separating device located between the nonlinear medium and the first direction correcting optic to spatially separate the one or more input optical fields not converted by the nonlinear properties of the nonlinear medium from the output optical field and to prevent the one or more input optical fields from propagating through the first direction correcting optic.

33. A method of frequency mixing photons of one or more input optical fields as claimed in claim 32 wherein selecting the position of the first direction correcting optic relative to the nonlinear medium comprises linearly translating the position of the first direction correcting optic.

34. A method of frequency mixing photons of one or more input optical fields as claimed in claim 32 wherein selecting the position of the first direction correcting optic relative to the nonlinear medium comprises rotating the position of the first direction correcting optic.

35. A method of frequency mixing photons of one or more input optical fields as claimed in claim 32 wherein spatially separating the output optical field further comprises removing photons from the one or more input optical fields spatially separated from the output optical field.

36. A method of frequency mixing photons of one or more input optical fields as claimed in claim 32 wherein phase matching the nonlinear medium to the one or more input optical fields comprises varying the rotational position of the nonlinear medium.

37. A method of frequency mixing photons of one or more input optical fields as claimed in claim 36 wherein the method further comprises compensating for deviation of the position and angle of propagation of the output field introduced by varying the rotational position of the nonlinear medium by selecting the position of a second direction correcting optic relative to the nonlinear medium dependent upon the selected wavelength of the output optical field.

38. A method of frequency mixing photons of one or more input optical fields as claimed in claim 37 wherein selecting the position of the second direction correcting optic relative to the nonlinear medium is automatically selected by a controller.

39. A method of frequency mixing photons of one or more input optical fields as claimed in claim 32 wherein phase matching the nonlinear medium to the one or more input optical fields comprises linearly translating the position of the nonlinear medium relative to the photons of one or more input optical fields.

40. A method of frequency mixing photons of one or more input optical fields as claimed in claim 32 wherein phase matching the nonlinear medium to the one or more input optical fields to select a wavelength of the output optical field generated by the nonlinear medium comprises heating the nonlinear medium.

41. A method of frequency mixing photons of one or more input optical fields as claimed in claim 32 wherein phase matching the nonlinear medium to the one or more input optical fields to select the wavelength of the output optical field generated by the nonlinear medium is automatically set by a controller.

42. A method of frequency mixing photons of one or more input optical fields as claimed in claim 32 wherein selecting the position of the first direction correcting optic relative to the nonlinear medium is automatically selected by a controller.

43. A method of frequency mixing photons of one or more input optical fields as claimed in claim 32 wherein the method further comprises automatically identifying the nonlinear medium.

44. A method of frequency mixing photons of one or more input optical fields as claimed in claim 43 wherein the method further comprises selecting a method of phase matching based on the identity of the nonlinear medium.

* * * * *